UNITED STATES PATENT OFFICE.

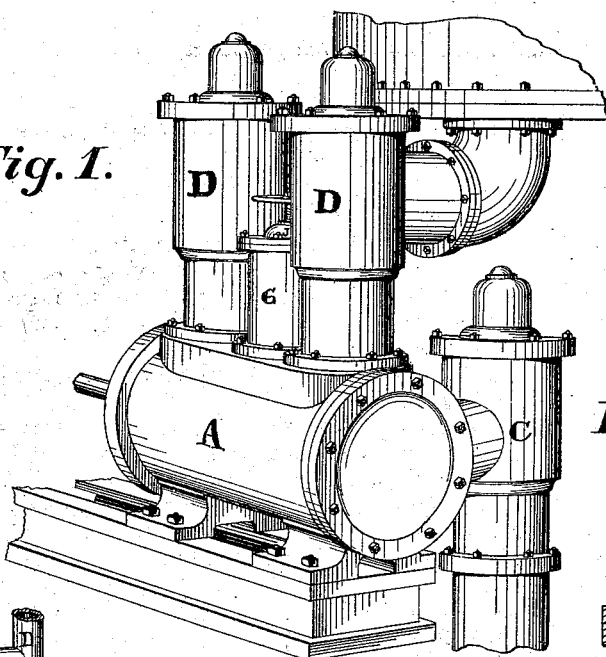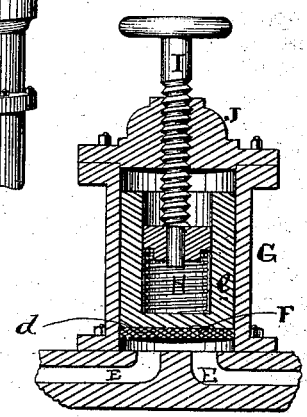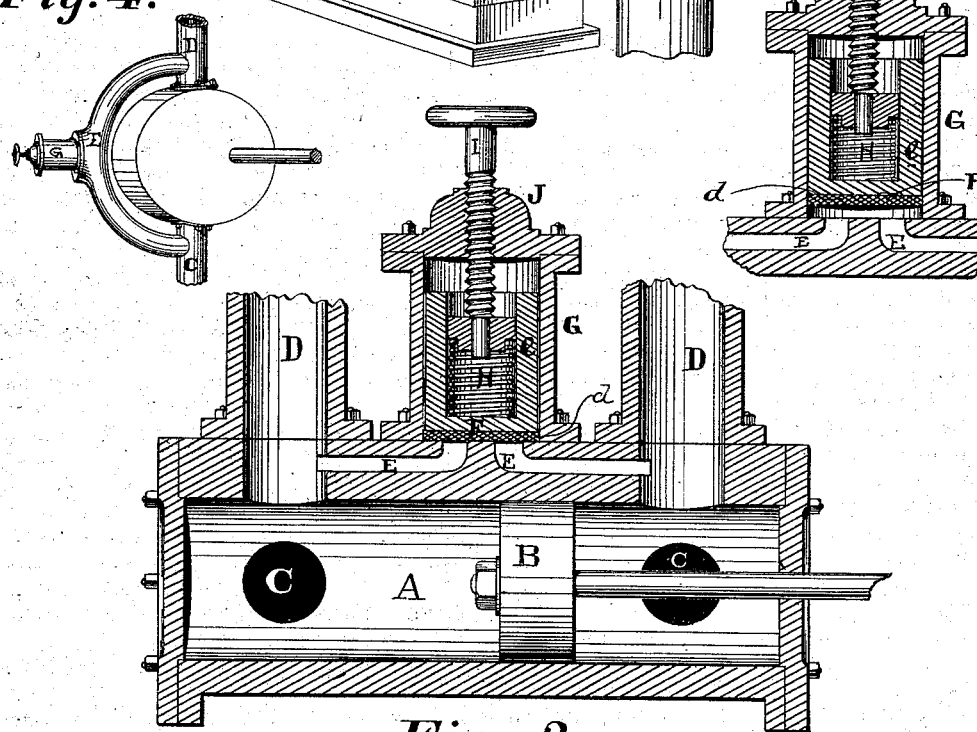

JOHN P. FLANDERS, OF VERGENNES, VERMONT.

IMPROVEMENT IN PUMPS.

Specification forming part of Letters Patent No. 154,468, dated August 25, 1874; application filed March 10, 1874.

*To all whom it may concern:*

Be it known that I, JOHN P. FLANDERS, of Vergennes, in the county of Addison and State of Vermont, have invented a new and useful Improvement in Pumps; and I do hereby declare the following to be a full, clear, and exact description of the same, reference being had to the accompanying drawings, in which—

Figure 1 is a perspective view of my invention in operative position. Fig. 2 is a longitudinal section of the same. Fig. 3 is a longitudinal section of the valve-chest, showing the valve open. Fig. 4 shows my invention applied to a rotary pump.

This invention relates more particularly to pumping-engines adapted to the delivery of large volumes of water, as in town or city supply, and especially where no stand-pipe or reservoir is employed.

For convenience, the following description will refer only to such engines as pump directly into the mains. In direct pumping, when the pipes become full, if the pumping machinery continues to force water the pressure will continue to increase until the pipes burst, unless relieved, and as soon as they are relieved, then water will commence again to be forced. In ordinary use, the outflow from the mains is a constantly fluctuating quantity, and the velocity of the outflow will be correspondingly fluctuating, unless some elastic regulator is employed capable of equalizing the flow from the engine into the mains exactly in accordance with the outflow therefrom. Heretofore the required equalization and relief have been obtained by the use of an automatic overflow-valve adjusted to open when the pressure exceeds a certain maximum. The water so escaping is lost, and in localities where the supply is limited, or in seasons of drought, such loss may amount to a serious inconvenience. Fluids move in lines of least resistance; and the object of my invention is to correct the above-named defect by the employment of an automatic valve, adjusted to yield at any desired pressure, and placed so that the water escaping through it may return behind the piston, and not issue out of the engine or main and be lost. A great variety of valves (weighted, spring, or balanced) may be used for this purpose; and I therefore do not confine myself to any particular kind or form of valve, although in the following specification I describe a valve in form and arrangement such as I consider convenient and well adapted to the purpose.

That others may fully understand my invention, I will particularly describe that form of it which is shown in the drawings.

A is a pump-cylinder, and B is a reciprocating piston moving therein. C C are the inlet-ports, and D D are the outlet-ports, connecting with the mains. The usual check-valves are employed in the inlet and outlet pipes. The duct E E connects the two ends of the cylinder A or the outlet with the inlet pipes in some other convenient location, and said port is closed by a valve, F, adjusted to yield only when the maximum pressure is attained, and permit water to escape from the front to the rear of the piston without passing out of the engine so as to be lost. I prefer to make the duct E in the cylinder A itself, or attached immediately thereto. If formed in the cylinder by coring when the same is cast, the two ends of said duct enter the outlets D D, and at the middle communicate with a valve-chest, G, so that the flat or puppet valve F may close the same, and prevent the passage of fluid through said duct. The valve F is composed of a flat disk, *d*, of india-rubber, or other suitable material, pressed down upon its seat by the sleeve piston or follower *e*, within which is placed a spring, H, of proper and sufficient strength. The required tension is imparted to said spring by means of a screw, I, working down through the cap J. I prefer to place the spring H within the sleeve-follower *e*, as it is thereby entirely inclosed and protected, and prevented from getting out of shape.

Supposing the desired maximum pressure in the mains to be sixty pounds to the inch, then it is evident that if the spring H is depressed with a force equal to said pressure the valve F will begin to yield immediately when the pressure in front of the piston exceeds said quantity, and water will escape to the rear of the piston, and thereby completely regulate and equalize the pressure in the main without any overflow and loss of water.

The valve F may be readily adjusted when the pump is in operation by increasing the tension of the spring H until the desired pressure is indicated by a pressure-gage.

It is evident that any valve capable of adjustment to yield at a definite pressure may be arranged in connection with a duct or pipe connecting the inlet and outlet ports of a pumping-engine, either reciprocating or rotary, to accomplish the purpose of my improvement, and save the water otherwise lost through an overflow-valve.

In Fig. 4 is shown a rotary pump with a single inlet and outlet pipe, and my equalizer-valve placed in a pipe connecting said inlet and outlet; but a double-acting piston-pump would be most conveniently fitted, as shown in Figs. 1 and 2.

Having described my invention, what I claim as new is—

The valve F, composed of the flat packing-disk $d$ and sleeve $e$, in combination with the tension-spring H, the adjusting-screw I, and ducts E, substantially as set forth.

J. P. FLANDERS.

Witnesses:
 GEORGE R. CHAPMAN,
 H. M. MITCHELL.